United States Patent [19]

Shinkai et al.

[11] Patent Number: 4,808,786
[45] Date of Patent: Feb. 28, 1989

[54] WIRE ELECTRODE TYPE ELECTRIC DISCHARGE MACHINING DEVICE WITH PREVENTABLE APPLICATION OF EXTERNAL FORCE TO ITS LOWER ARM

[75] Inventors: Masaru Shinkai; Makoto Tanaka; Jun Aramaki; Masaaki Onizuka, all of Aichi, Japan

[73] Assignee: Mitsubishi Denki Kabushiki Kaisha, Tokyo, Japan

[21] Appl. No.: 105,774

[22] Filed: Oct. 7, 1987

[30] Foreign Application Priority Data

Oct. 7, 1986 [JP] Japan .................... 61-238531
Oct. 7, 1986 [JP] Japan .................... 61-238532
Oct. 7, 1986 [JP] Japan .................... 61-238533

[51] Int. Cl.4 ............................... B23H 7/10
[52] U.S. Cl. ............................................. 219/69 W
[58] Field of Search .............. 219/69 D, 69 W, 69 R; 204/206, 224 M

[56] References Cited

U.S. PATENT DOCUMENTS

| | | | |
|---|---|---|---|
| 4,363,949 | 12/1982 | Pfau et al. | 219/69 W |
| 4,392,195 | 7/1983 | Inoue | 219/69 W |
| 4,521,661 | 6/1985 | Inoue | 219/69 W |
| 4,565,915 | 1/1986 | Girardin | 219/69 W |
| 4,647,747 | 3/1987 | Goto | 219/69 W |
| 4,663,509 | 5/1987 | Kawashima | 219/69 W |

FOREIGN PATENT DOCUMENTS

| | | | |
|---|---|---|---|
| 206321 | 12/1983 | Japan | 219/69 D |
| 169726 | 9/1984 | Japan | 219/69 D |

Primary Examiner—A. D. Pellinen
Assistant Examiner—Geoffrey S. Evans
Attorney, Agent, or Firm—Sughrue, Mion, Zinn, Macpeak, and Seas

[57] ABSTRACT

A wire electrode type electric discharge machining device including a wire electrode confronting a workpiece with a small space therebetween, wherein electric discharge is caused to take place in the small space to machine the workpiece; an upper wire guide for slidably supporting the wire electrode above the workpiece; a lower wire guide for slidably supporting the wire electrode below the workpiece; a driver for supporting and moving the workpiece relative to the wire electrode in the horizontal direction; a lower arm for holding the lower wire guide at a position confronting the upper wire guide means. The electric discharge machining device further includes a protecting cover for covering the lower arm with a space therebetween, a splash preventing device which is movable with expansion and contraction with the movement of the workpiece for preventing machining solution jetted towards the small space between the workpiece and the wire electrode from splashing, and a holding device for fixedly holding the splash preventing device.

12 Claims, 6 Drawing Sheets

WIRE ELECTRODE TYPE ELECTRIC DISCHARGE MACHINING DEVICE WITH PREVENTABLE APPLICATION OF EXTERNAL FORCE TO ITS LOWER ARM

BACKGROUND OF THE INVENTION

1. Field of the Invention

This invention relates to a wire electrode type electric discharge machining device, and more particularly relates to the structure of the device which prevents the application of as external force to its lower arm for supporting a wire guide.

2. Description of the Prior Art

The conventional wire electrode type electric discharge machining device has been introduced by Japanese Patent Application Unexamined Publication No. 89524/82 and Japanese Utility Model Application Publication No. 30031/82, etc.

Figure 1:
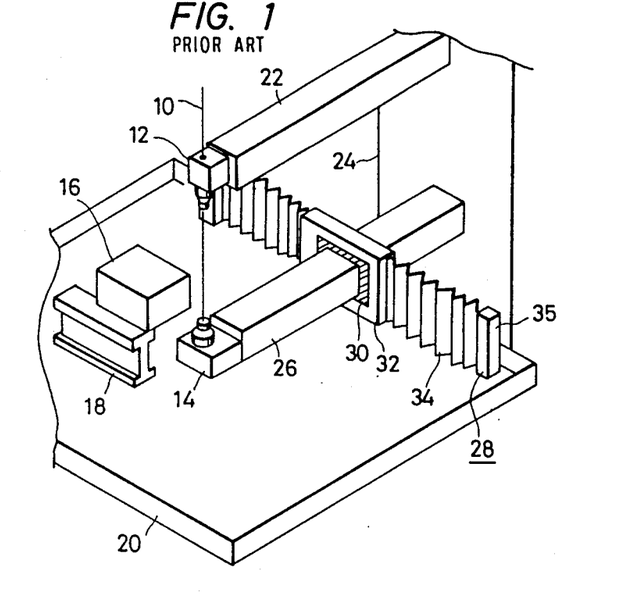
FIG. 1 is a perspective view showing a conventional wire electrode type electric discharge maching device.

FIG. 1 is a perspective view showing an example of the arrangement of a conventional wire electrode type electric discharge machining device.

Figure 2:
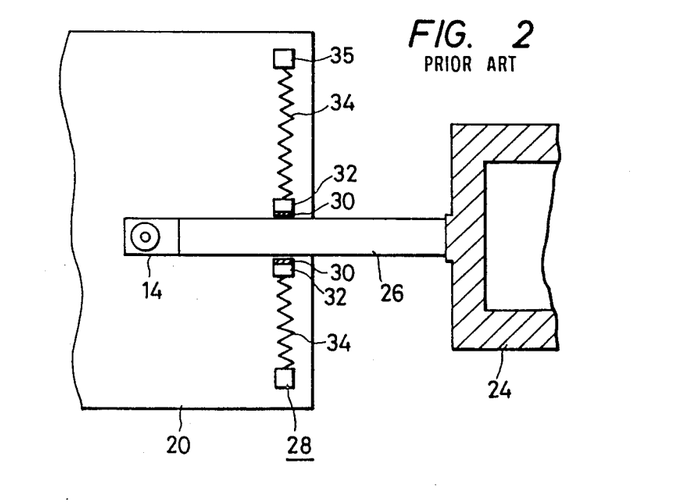
FIG. 2 is a sectional plan view showing a part of the conventional device shown in FIG. 1.

In FIG. 1, a wire electrode 10 is guided by an upper wire guide 12 and a lower wire guide 14 which are located bove and below a workpiece 16, respectively, so that the wire electrode 10 is slidable in the up-and-down directions. A surface plate 18 is placed on a machining tank 20 to hold the workpiece 16. An upper arm 22 is located above the workpiece 16 serves to hold the upper wire guide 12, the upper arm 22 being secured to a column 24 of the machine body. A lower arm 26 is located below the workpiece 16 serves to hold the lower wire guide 14 in such a manner that the lower wire guide 14 confronts the upper wire guide 12 held by the upper arm 22. A splash preventing body 28 is so arranged as to prevent machining solution (generally water) jetting from the respective upper and lower wire guides 12 and 14 towards the workpiece 16 from splashing. The splash preventing body 28 is made up of a frame 32, a seal 30 which is provided inside the frame 32 as to being slidable in the longitudinal direction of the lower arm 26, a pair of pleated members 34 connected to both sides (laterally of the lower arm 26) of the frame 32 in such a manner that they are expandable and contractable, and a support 35 which fixes both ends of the pleated members 34 to the machining tank 20. FIG. 2 is a sectional view of the body of the electric discharge machining device thus constructed.

The operation of the electric discharge machining device thus constructed will be described.

In machining the workpiece 16, the wire electrode 10 is fed downwardly or upwardly with a wire feeding system (not shown).

The workpiece 16 can be moved relative to the wire electrode 10 in the horizontal direction by means of an X-Y cross table (not shown) with the aid of the machining tank 20 and the surface plate 18. In machining the workpiece 16, the X-Y cross table (not shown) is moved so that the workpiece 16 confronts the wire electrode 10 with a small space therebetween, and the machining solution is jetted from the upper and lower wire guides 12 and 14 into the space. Under this condition, explosive electric discharge is caused between the wire electrode 10 and the workpiece 16 through the machining solution. As a result, the wire electrode and the workpiece 16 are partly blown away. In this operation, wherein the wire electrode 10 is being fed continuously, the wire electrode 10 is not cut off. The workpiece can be machined as required by moving the X-Y table.

The machining solution jetting during the machining operation may flow down the lower arm 26; however, it is blocked by the seal 30, so that it is recovered into the machining tank 20 without flowing over the splash preventing body 28.

Figure 3:
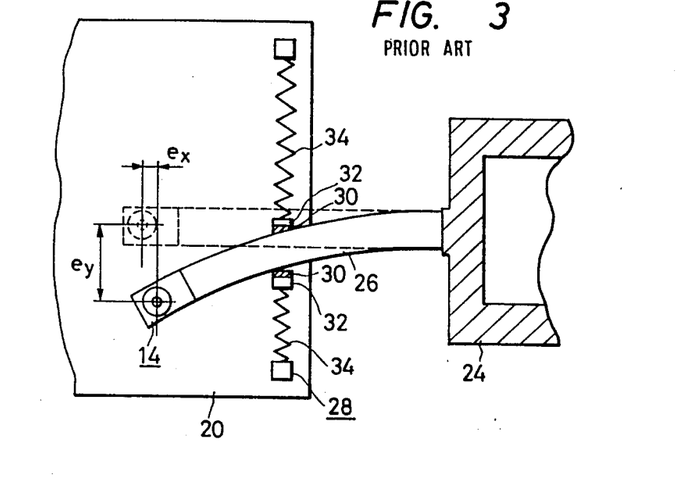
FIG. 3 is a sectional plan view showing an external force applied to the conventional device shown in FIG. 2.

The conventional wire electrode type electric discharge machining device is constructed as described above. Therefore, in the case where the table is moved laterally of the lower arm 26 to machine the workpiece, an external force produced with expansion and contraction of the pleated members 34 acts on the lower arm 26, so that the lower arm 26 is deformed as shown in FIG. 3; that is, the lower wire guide 14 held by the lower arm 26 is shifted by eX in the X-direction and eY in the Y-direction from the upper wire guide 12. Because of this shift, the workpiece machined is not correct in configuration; that is, the workpiece cannot be machined with high accuracy. Furthermore, other external forces, which are produced for instance when scraps cut off the workpiece are brought into contact with the lower arm 26, act on the lower arm 26, thus lowering the maching accuracy greatly.

SUMMARY OF THE INVENTION

The present invention is intended to solve the above problems, and it is therefore an object of the invention to provide a wire electrode type electric discharge machining device in which the lower arm is free from external forces, and the decrease in machining accuracy of a workpiece due to the deformation of the lower arm, which is caused by the external forces, is prevented.

According to the present invention, the foregoing object has been achieved by the provision of a wire electrode type electric discharge machining device comprising an upper wide guide for movably holding a wire electrode above a workpiece, a lower wire guide for movably holding the wire electrode below the workpiece, a lower arm for holding the lower wire guide, and a protection cover spaced apart from the outside of the lower arm.

Another object of the present invention is to provide a wire electrode type electric discharge machining device in which the application of a force produced by the splash preventing body to the lower arm is positively prevented, whereby a decrease in the machining accuracy of the workpiece due to deformation of the lower arm can be prevented.

According to the present invention, the foregoing object has been achieved by the provision of a wire electrode type electric discharge machining device comprising an upper wire guide for movably holding a wire electrode above a workpiece, a lower wire guide for movably holding the wire electrode below the workpiece, a lower arm for supporting the lower wire guide, a splash preventing body for preventing machining solution from splashing, and a holding body for receiving a force produced by the splash preventing body to the lower arm.

DETAILED DESCRIPTION OF THE PREFERRED EMBODIMENTS

One embodiment of this invention will be described with reference to the accompanying drawings.

Figure 4:
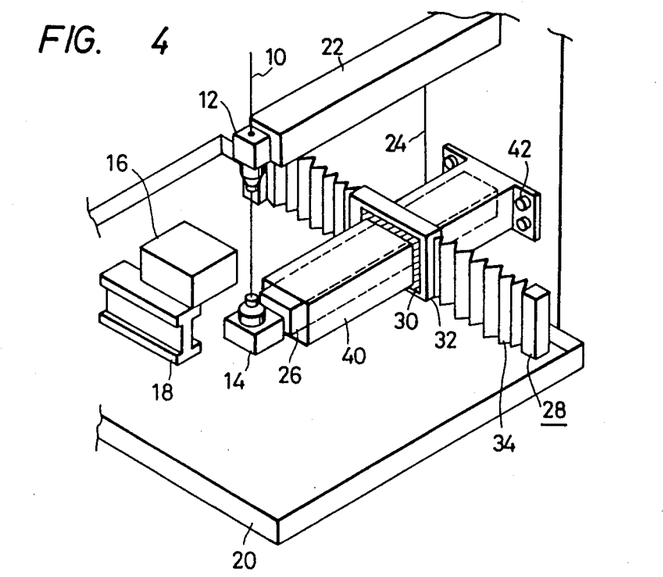
FIG. 4 is a perspective view showing a wire electrode type electric discharge machining device according to one embodiment of the present invention.
Figure 5:
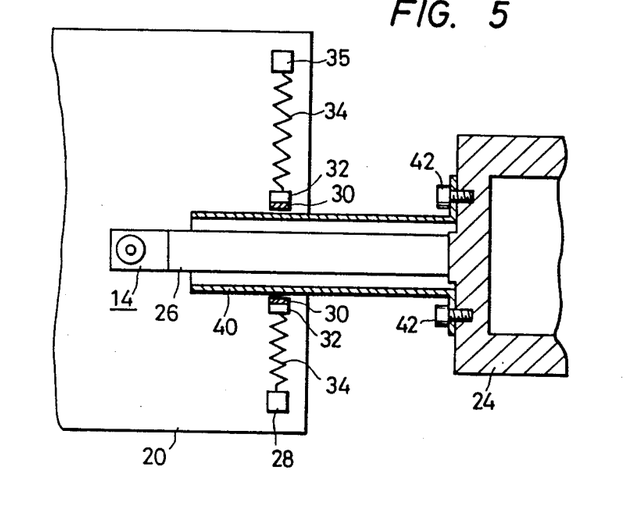
FIG. 5 is a sectional plan view showing a part of the device shown in FIG. 4.
Figure 6:
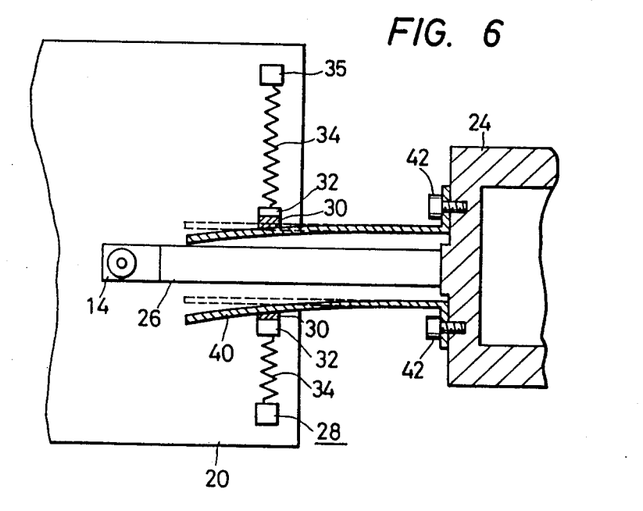
FIG. 6 is a sectional plan view showing an operation of a protecting cover provided in the device shown in FIGS. 4 and 5.

In FIGS. 4 to 6, reference numeral 40 designates an arm protecting cover into which a lower arm 26 is inserted in such a manner that the arm protecting cover 40 is not in contact with the lower arm 26. One end of the arm cover 40 is fixedly secure to a column 24 of the machine body with a plurality of bolts 42.

In the wire electrode type electric discharge machining device, a splash preventing means 28 is the same as one in the conventional device. However, it should be noted that, as shown in the figures, a seal member 30 is fitted on a frame 32 in such a manner that the seal member 30 is slidable along the periphery of the arm cover 40.

The operation of the device thus constructed will be described. Its wire electrode type electric discharge machining method is the same as that of the conventional device. Therefore, the operation of the device will be described with reference to the case in which an external force is applied to the lower arm.

In machining a workpiece in the lateral direction of the lower arm 26, that is, in the direction which intersects with the longitudinal direction of the arm 26, a machining tank 20 is horizontally moved by the movement of the X-Y cross table (not shown). Under this condition, one of pleated members 34 expands while the other contracts. In this operation, an external force for expanding and contracting the plated members 34 acts on the arm protecting cover 40, as a result of which the arm protecting cover 40 is deformed as shown in FIG. 6. However, in this case, unlike the case of the conventional device shown in FIG. 3, since the lower arm 26 is spaced apart from the arm protecting cover 40, the lower arm 26 is free from the external force, and therefore it is not deformed at all. Accordingly, the horizontal relative position of the upper and lower wire guides 12 and 14 is maintained substantially constant, and the workpiece can be machined with high accuracy. Furthermore, the external force produced by scraps cut off the workpiece will not be transmitted to the lower arm 26 because of the provision of the arm protecting cover, and will not affect the machinging accuracy of the device.

The above-described embodiment is provided with the splash preventing body 28; however, the body 28 may be eliminated.

While the embodiment has been described with reference to the case where the machining solution is jetted, the technical concept of the invention can be equally applied to a wire electrode type electric discharge machining device in which a workpiece is immersed in the machining solution stored in a machining tank 20.

In the above-described embodiment, the lower arm 26 is cantilevered; however, it may be supported at both ends.

As described above, according to one embodiment of the invention the external force is not transmitted to the lower arm, and accordingly the latter is not deformed at all. Therefore, in the device of the invention, the horizontal relative position of the upper and lower wire guides is maintained substantially constant. Thus, the wire electrode type electric discharge machining device is high in machining accuracy.

Another embodiment of the present invention will be described with reference to FIGS. 7 to 9.

Figure 7:
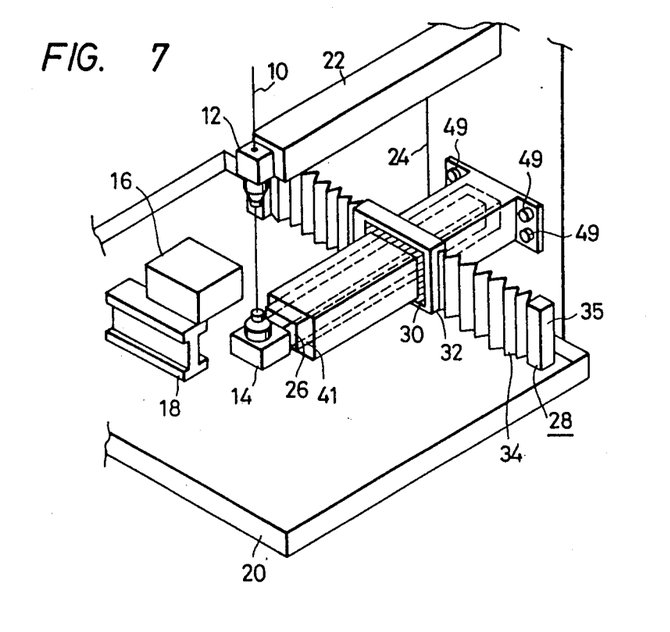
FIG. 7 is a main perspective view showing a wire electrode type electric discharge machining device according to another embodiment of the present invention.
Figure 8:
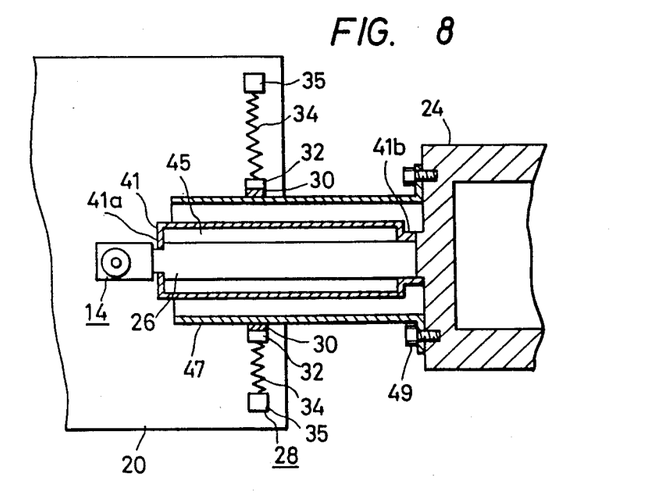
FIG. 8 is a sectional plan view showing a part of the device shown in FIG. 7.
Figure 9:
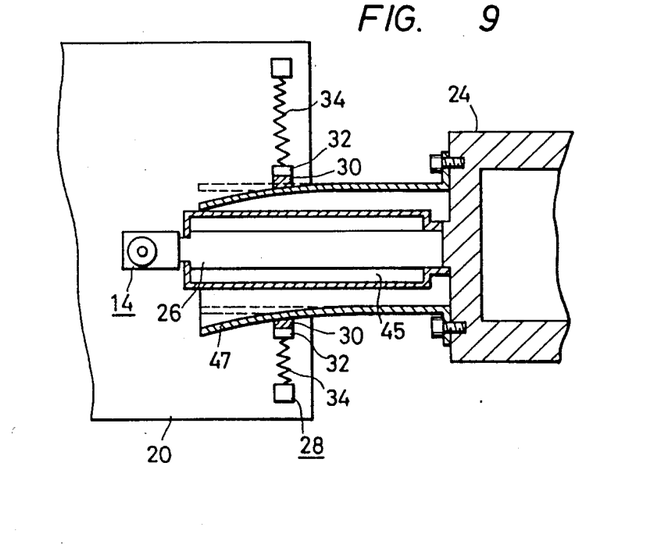
FIG. 9 is a sectional plan view showing an operation of first and second arm covers provided in the device shown in FIGS. 7 and 8.

The feature of the embodiment shown in FIGS. 7 to 9 is that the lower arm is covered with a first arm cover, and the first arm cover is further covered with a second arm cover.

In FIGS. 7 through 9, reference numeral 41 designates a first arm cover with a front end 41a and a rear end 41b. The first arm cover 41 is fixedly mounted on the lower arm 26 in such a manner that an air chamber 45 is formed between the arm cover 40 and the lower arm 26. Reference numeral 47 designates a second arm cover which is secured to the column 24 with bolts 49 in such a manner that it is spaced from the lower arm 26 and the first arm cover 41.

In the wire electrode type electric discharge machining device, the splash preventing body 28 is the same in structure as the first embodiment shown in FIGS. 4–6. However, it should be noted that the seal member 30 is slidable on the peripheral surface of the second arm cover 47. Other constitutions are the same as those in the embodiment of of FIGS. 4–6, and therefore the same element is represented by the same mark, and the detailed description will be omitted.

The operation of the device thus constructed will be described. Its wire electrode type electric discharge machining method is the same as that of the first embodiment of the invention. Therefore, the operation of the device will be described with reference to the case where a thermal effect or external force is applied to the lower arm.

In machining a workpiece laterally of the lower arm, with movement of the X-Y cross table (not shown) one of the pleated members 34 expands while the other contracts. In this operation, an external force for expanding and contracting the pleated members 34 acts on the second arm cover 47, so that the latter 47 is deformed as shown in FIG. 9. However, in this prior art machining device, unlike the case of FIG. 3, the lower arm 26 is free from the external force; that is, it is not deformed at all because the second arm cover 47 is spaced apart from the lower arm 26.

When the machining solution is splashed towards the lower arm, it is first applied to the first arm cover. Therefore, the variation of the temperature of the machining solution is gradually transmitted through the air chamber 45 to the lower arm 26. Therefore, in the case where the temperature of the machining solution is made equal to the ambient temperature of the electric discharge machining device, the upper arm 22 becomes equal in the time constant of internal temperature change to the lower arm 26. Accordingly, in this case, the horizontal relative position of the upper and lower wire guides 12 and 14 is maintained constant. Therefore, the workpiece can be machined with high accuracy. Furthermore, the external force produced by scraps cut off the workpiece 16 will not be transmitted to the lower arm 26 because of the provision of the arm cover, and will not affect the machining accuracy of the device.

The above-described another embodiment is provided with the splash preventing body 28; however, the preventing body may be eliminated.

While the embodiment of FIGS. 7-9 has been described with reference to the case where the machining solution is jetted, the technical concept of the invention can be equally applied to a wire electrode type electric discharge machining device in which its machining solution is stored in a machining tank and a workpiece is immersed in the machining solution.

In the above-described embodiment of FIGS. 7-9, the lower arm 26 is cantilevered. However, it may be supported at both ends.

The material of the arm covers 40, 41 and 47 used in the embodiments thus described may be an electrically insulating material, and preferably a low thermal conductive material.

As was described above, according to the embodiment of FIGS. 7-9, the lower arm is free from the external forces produced by scraps cut off the workpiece. Therefore, the lower arm is not deformed, and the horizontal relative position of the upper and lower wire guides is maintained substantially unchanged. Thus, the wire electrode type electric discharge machining device of the invention is high in machining accuracy.

A further embodiment of this invention will be described with reference to FIGS. 10 and 11.

Figure 10:
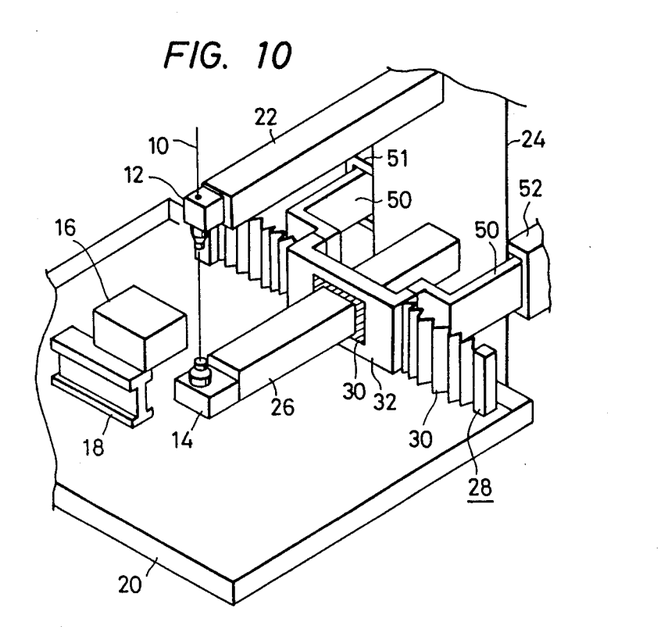
FIG. 10 is a main perspective view showing a wire electrode type electric discharge machining device according to a further embodiment of the present invention.
Figure 11:
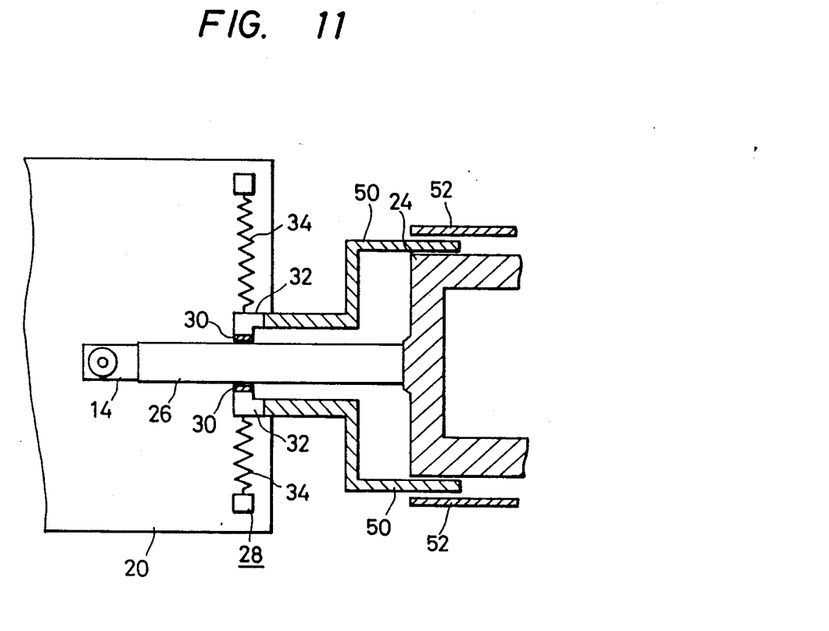
FIG. 11 is a sectional plan view showing a part of the device shown in FIG. 10.

In FIGS. 10-11, reference numeral 50 designates holding mesans for holding both (right and left) sides of the frame 32 of the machining solution splash preventing body 28. The holding body 50 are held in two guides 52 which is fixedly provide at both sides of the column 24, respectively, in such a manner that the holding body is slidable in the longitudinal direction of the lower arm 26 but is not movable laterally of the lower arm 26. The other elements are the same as those of the foregoing embodiments of the invention.

The operation of the device of the invention will be described. Its wire electrode type electric discharge machining method will be omitted. Therefore, the operation of the device will be described with reference to the case where an external force is exerted on the lower arm.

In machining a workpiece laterally of the lower arm 26, with movement of the X-Y cross table (not shown) one of the pleated members 34 of the splash preventing body 28 expands while the other contracts. In this operation, an external force for expanding and contracting the pleated members acts on the holding body 50, but not on the lower arm; that is, the lower arm is not deformed. Accordingly, the horizontal relative position of the upper and lower wire guides 12 and 14 is maintained unchanged. Therefore, the workpiece can be machined with high accuracy.

In machining the workpiece longitudinally of the lower arm 26, the holding body 50 are slid on the guides 52 so that they are moved on together with the frame 32 of the machining solution splash preventing body 28.

Accordingly, in case the workpiece 16 is moved with the machining tank 20 in the longitudinal direction of the lower arm 26, with the movement the machining solution splash preventing body 28 is also moved in the longitudinal direction of the lower arm 26.

While the embodiment of the invention shown in FIGS. 10 and 11 has been described with reference to the case where the machining solution is jetted, the technical concept of the invention can be equally applied to a wire electrode type electric discharge machining device in which a workpiece 16 is immersed in the machining solution in a machining tank 20.

In the above-described embodiment, the lower arm 26 is cantilevered; however, it may be supported at both ends.

As was described above, according to a further embodiment of the invention, the machining solution splash preventing body which the lower arm holding the lower wire guide means penetrates is held by the holding body which is apart from the lower arm. Therefore, the external force produced by the splash preventing body is not transmitted to the lower arm, and accordingly the latter is not deformed at all, with the result that the horizontal relative position of the upper and lower wire guides is maintained unchanged. Thus, the wire electrode type electric discharge machining device of the invention can machine a workpiece with high accuracy.

What is claimed is:

1. A wire electrode type electric discharge machining device, comprising:

a wire electrode confronting a workpiece with a small space therebetween, said wire electrode being operable for causing an electric discharge to occur in the small space to machine the workpiece;

upper wire guide means for slidably supporting said wire electrode above the workpiece;

lower wire guide means for slidably supporting said wire electrode below the workpiece;

drive means for supporting and moving the workpiece relative to said wire electrode in the horizontal direction;

a lower arm for holding said lower wire guide means at a position confronting said upper guide means;

splash preventing means for preventing machining solution jetted towards the small space from splashing, said splash preventing means being movable and connected to said lower arm; and protective cover means for covering said lower arm, said protective cover means being positioned relative to said lower arm such that a first predetermined space is formed therebetween sufficient to assure that said lower arm is not deformed from an external force produced when said splash preventing means moves.

2. A device as claimed in claim 1, further comprising means provided in at least one of said upper and lower wire guide means for jetting machining solution toward the small space between said wire electrode and said workpiece.

3. A device as claimed in claim 2, in which said driving means is provided with a machining tank for receiving said workpiece and the jetted machining solution therein.

4. The device as claimed in claimed in claim 1, wherein said holding means further comprises two holding members which are connected to respective sides of said frame.

5. A device as claimed in claim 1, in which said protective cover means comprises: a first cover covering the periphery of said lower arm, said first cover being positioned relative to said lower arm such that the first predetermined space is formed therebetween; and a second cover covering the periphery of said first cover, said second cover being positioned relative to said first cover such that a second predetermined space is formed between said first and second covers.

6. The device as claimed in claim 1, wherein said holding means further comprises two guides, each of said two holding members being positioned in a respective guide such that said holding means is slidable in the longitudinal direction of said lower arm, and such that said holding means is not movable laterally of said lower arm.

7. A wire electrode type electric discharge machining device, comprising:
a wire electrode confronting a workpiece with a small space therebetween;
upper wire guide means for slidably supporting said wire electrode above said workpiece;
lower wire guide means for slidably supporting said wire electrode below said workpiece;
drive means for supporting and moving said workpiece relative to said wire electrode in the horizontal direction;
a lower arm for holding said lower wire guide means at a position confronting said upper guide means;
splash preventing means for preventing machining solution jetted toward the small space provided between said workpiece and said wire electrode from splashing, said splash preventing means comprising a pair of pleated members expandable and contractible with movement of the workpiece by said drive means; and
holding means for fixedly holding said splash preventing means, said holding means being arranged to prevent an external force produced by said splash preventing means from deforming said lower arm.

8. A device as claimed in claim 7, further comprising means provided in at least one of said upper and lower wire guide means for jetting the machining solution toward the small space provided between said workpiece and said wire electrode.

9. A device as claimed in claim 8, in which said drive means is provided with a machining tank for receiving said workpiece and the jetted machining solution therein, said splash preventing means being fitted on said machining tank.

10. A device as claimed in claim 9, further comprising a frame connected to one end of said pair of pleated members, said frame being hard and penetrated by said lower arm, and connected to said holding means.

11. A device as claimed in claim 7, wherein said holding means is slidable in the longitudinal direction of said lower arm and is not being movable in the lateral direction of said lower arm, such that an external force produced from expansion and contraction of said splash preventing means does not deform said lower arm.

12. A wire electrode type electric discharge machining device, comprising:
a wire electrode confronting a workpiece with a small space therebetween, wherein electric discharge is caused to take place in the small space to machine said workpiece;
upper wire guide means for slidably supporting said wire electrode above said workpiece;
lower wire guide means for slidably supporting said wire electrode below said workpiece;
driving means for supporting and moving said workpiece relative to said wire electrode in the horizontal direction;
a lower arm for holding said lower wire guide at a position confronting said upper wire guide means; and
a protecting cover for covering said lower arm with a space therebetween.

* * * * *